United States Patent [19]
Cardew

[11] Patent Number: 5,247,170
[45] Date of Patent: Sep. 21, 1993

[54] INFORMATION SCANNER PROVIDING TWO SEPARATE DIGITAL IMAGES OF A WRITTEN TEXT

[75] Inventor: Marcus St. E. Cardew, Cumbria, United Kingdom

[73] Assignee: Swift 943 LTD T/A System Technologies, United Kingdom

[21] Appl. No.: 816,182

[22] Filed: Jan. 2, 1992

[30] Foreign Application Priority Data

Jan. 3, 1991 [GB] United Kingdom ................. 9100078

[51] Int. Cl.$^5$ ............................................... H01J 5/16
[52] U.S. Cl. ................................ 250/227.13; 235/472
[58] Field of Search ........................... 250/215, 227.13; 235/432, 473, 472; 382/52, 48, 61

[56] References Cited

U.S. PATENT DOCUMENTS

| | | | |
|---|---|---|---|
| 3,781,555 | 12/1973 | Keefe | 250/227.13 |
| 4,053,765 | 10/1977 | Kuffer | 250/227.13 |
| 4,760,606 | 7/1988 | Lesnick et al. | 382/48 |

Primary Examiner—David C. Nelms
Assistant Examiner—T. Davenport
Attorney, Agent, or Firm—Salter, Michaelson & Benson

[57] ABSTRACT

An information scanning apparatus for scanning and marking parts of a written text comprises two viewing elements (14,16) for forwarding information concerning scanned text to a linescan camera (42) so as to provide two physically displaced digital images of the relevant parts of the text. A highlighter pen (34) located adjacent the viewing elements (14,16) marks the scanned text as well as providing control feedback to the scanning operation such that the apparatus can deal with variations in speed, text quality and attitude of the scanning head 10.

7 Claims, 2 Drawing Sheets

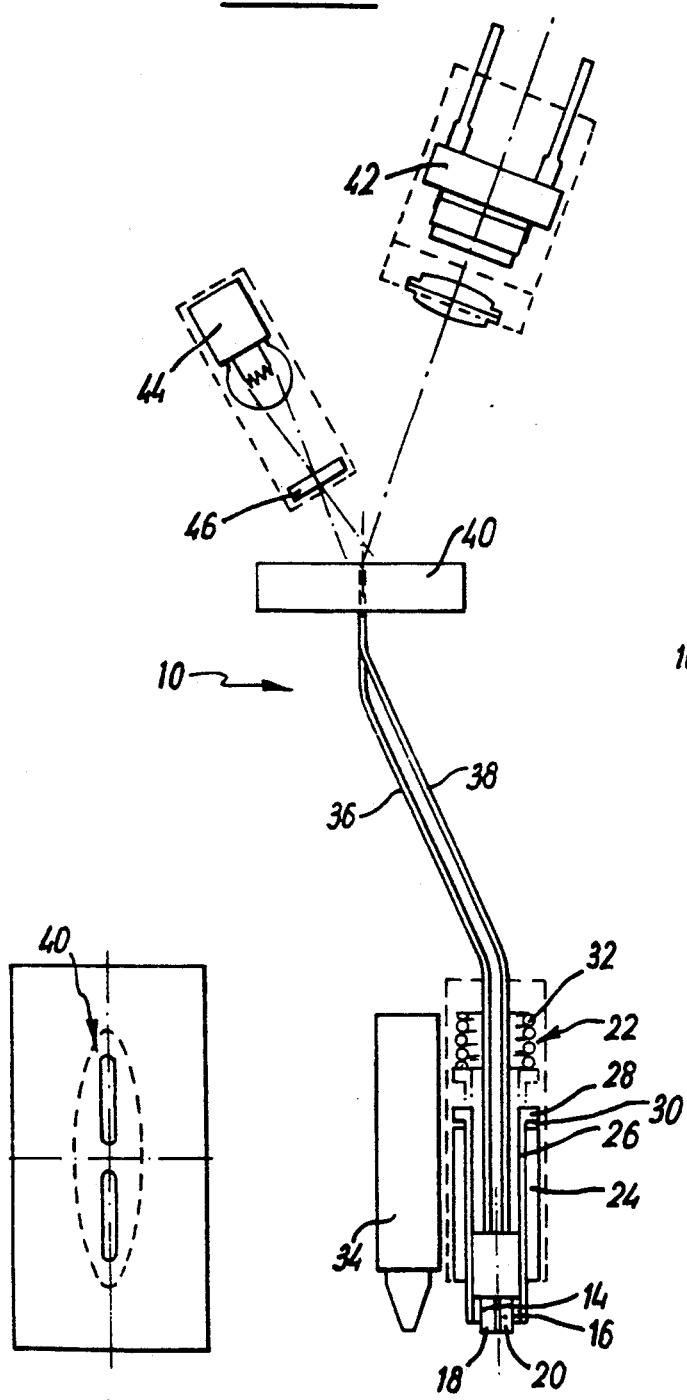
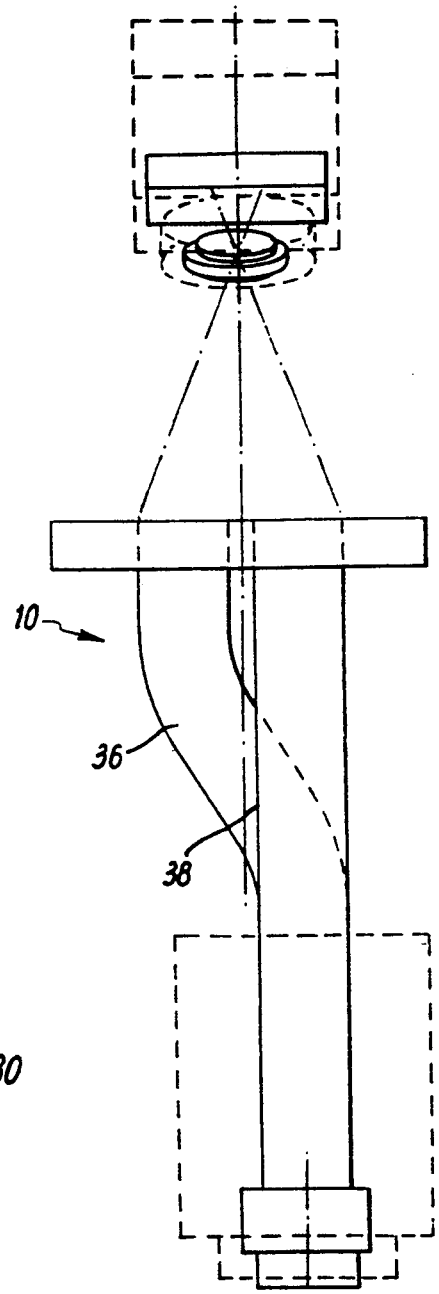

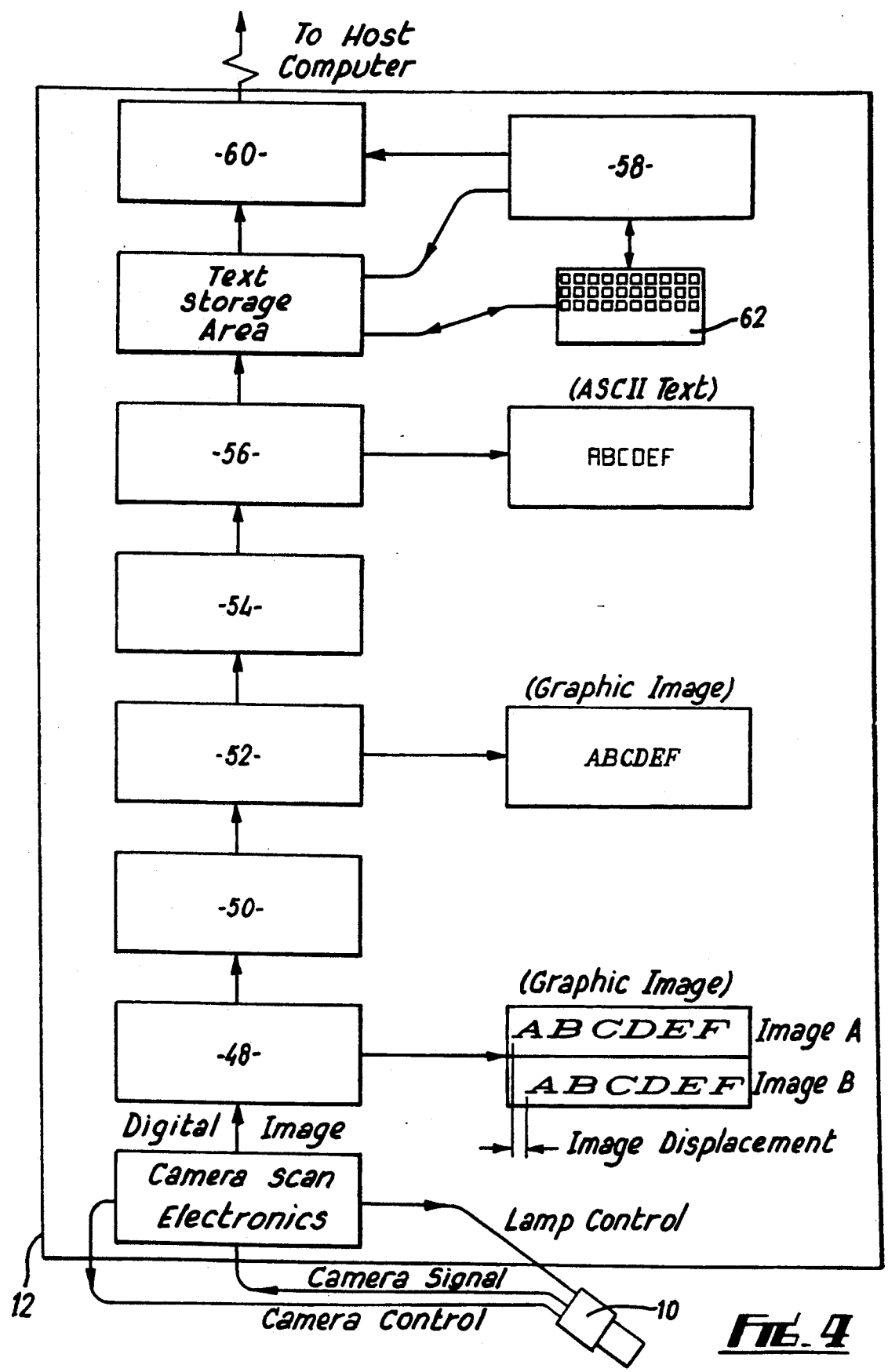

INFORMATION SCANNER PROVIDING TWO SEPARATE DIGITAL IMAGES OF A WRITTEN TEXT

The present invention relates to information scanning apparatus and more particularly, but not exclusively to portable information scanning apparatus.

The present invention has been made from a consideration of the problems associated with studying large volumes of documents. Documents are often studied whilst travelling or at home rather than at the workplace. When items of interest are found, scribbled notes may be made in the margins of the documents. Having made the notes the reader seldom has time to store the information in a manner suitable for easy retrieval.

EP 0142967 discloses an apparatus for scanning readable information. A guide sheet is placed on the document and the scanner head runs along a track in the guide sheet reading the information. Timing marks are provided on the guide sheet adjacent the track for generating timing signals having a frequency proportional to the speed of travel of the scanner head. The combination of ruler and timing marks provide scanner information in a geometrical and consistent coordinate frame.

The present invention seeks to provide a portable scanning apparatus which may store information without the need for a track or timing marks. The invention will prove particularly useful to users who have to read large volumes of printed information and need to remember and note document references, pages or keywords.

According to the present invention there is provided an information scanning apparatus for scanning human interpretable information, said apparatus comprising at least one image receiving means adapted to scan said information, wherein the image receiving means is adapted to provide at least one digital image of said information and the apparatus further comprises a stability device, the stability device providing a bearing surface for the user to apply pressure to the information to be scanned.

By using the stability device improved scanning is achieved. The apparatus should be able to cope with variations in scanning speed, text quality, text size and attitude of the scanning head. Otherwise this will result in distortions. However these variations are reduced to a considerable extent by the use of the pen which introduces an element of control feedback to the operation.

In a preferred embodiment of the invention the image receiving means provides two different digital images of said information. No supplementary direction, distance or speed measuring device is required. The two different images are preferably images which are relatively physically displaced. The two effectively physically displaced images may be extracted from an image presented to an area imaging camera. These images may be obtained by suitable arrangement of two individual imaging cameras such as linescan cameras provided in the scanning apparatus. Alternatively two adjacent coherant linear light guides present their views to a linescan camera whereby each individual image can be discriminated from the other. Alternatively one light guide may provide an image for each camera. The end of the light guide which faces the camera may be illuminated by way of a light source in such a manner as not to reflect direct light into the viewing camera which is arranged to collect light reflected from the text at the other end of the light guide. The stability device may comprise a pen or brush. This stability device may be provided adjacent the image receiving means. Ink from the stability device may make a permanent mark of what information has been scanned. The image receiving means may comprise two viewing elements which preferably are mounted in the image receiving means in such a manner that they are not rotatable relative to one another and/or axially rotatable about the viewing axis. Means for axial translation of the image receiving means including the viewing elements may be provided in the device. Resilient means such as a spring may resist this movement.

At least one digital image is normalised and passed to the input of a text recogniser. Here the text characters are converted to computer codes. These may then be subject to any of the following: storage, manipulation, offloading and conversion onto a human interpretable format.

In order that the invention may be more readily understood a specific embodiment thereof will now be described by way of example only with reference to the accompanying drawings in which:

FIG. 1 is a side elevation of a scanning head in accordance with the invention;

FIG. 2 is a second side elevation of the scanning head of FIG. 1;

FIG. 3 is a plan view of the screen of the scanning apparatus of FIGS. 1 and 2; and FIG. 4 is a block diagram showing the scheme of operations of the scanning apparatus partly illustrated in FIGS. 1 to 3.

Referring to the drawings an information scanner comprises a scanner head 10 connected to a portable computer 12.

The scanning head 10 comprises two viewing elements 14,16 the free ends 18,20 of which when in use are run over the text to be stored. The viewing elements 14,16 are mounted in the scanning head 10 by way of a mounting 22. The mounting 22 comprises an outer casing 24 and an inner sleeve 26. The sleeve 26 and casing 24 may have angular features in order to assist in restricting the rotation of the viewing elements 14,16 with respect to the casing. A flange 28 is provided at the topside of the sleeve 26 which is urged towards the upper end 30 of the casing 24 by a coil spring 32. In this way the viewing elements 14,16 are mounted such that axial rotation relative to the viewing axis and radial rotation with respect to the casing 24 are restricted. However rotation in the axis of the viewing line of the viewing elements 14,16 and axial translation along the principal axis of the viewing elements 14,16 against the force of the spring 32 are not prevented. The viewing elements 14,16 are therefore mounted in such a manner as to provide a wide range of suitable relative angles between the text and the scanning head during which the text can be read.

An ink marking brush or pen 34 is adapted to provide a light transparent mark on the text. The brush or pen 34 is secured to the side of the casing 24. The direction of the nib of the pen 34 is parallel to the direction of the visual elements 14,16. The nib of the pen 34 preferably comprises a smooth shaped bearing of material such as P.T.F.E. that does not damage the material being scanned. Pens 34 known as highlighter pens are particularly suitable.

The pen 34 acts as a stabilising device to improve the accuracy of the scanner when scanning a line of text.

The stabilising device provides a bearing surface for the user to apply pressure to scanned text. Any text marked by the highlighter pen 34 is also captured digitally by the scanner.

Each viewing element 14,16 is connected to one of a pair of adjacent coherant linear light guides 36,38. The light guides 36,38 comprise parallel optical fibres mounted tightly adjacent one another. The light guides 36,38 present their views to a polished flat screen 40. A linescan camera 42 is provided on the side of the screen 40 which is remote from the visual elements 14,16.

The text displayed on the screen is illuminated by way of a directional light source. The light source comprises a light projector 44 which directs light towards the screen 40 via a lens 46 in such a manner as not to reflect direct light into the viewing camera 42 arranged to collect light reflected from the text at the other end of the light guides. The light projector 44 and camera 42 are mounted adjacent one another at suitable angles whereby the maximum amount of light from the projector 44 enters the light guides 36,38 and the maximum amount of light reflected from the viewing surface of the text is visible to the camera 42. This light emitted from the projector 44 is transmitted to a visual element via a light guide 36,38 reflected back up the same light guide 36,38 to the screen 40 by a document in contact with the viewing elements 14,16 where it is viewed by the camera 42.

Dependant upon whether black or white portions of the viewed text are under each fibre of the viewing element, either less or more light is reflected back along the same fibre to the screen end 40 of light guides 36,38 where it is radiated out from the fibre, exactly as if the light had been shone directly into the viewing elements. Each individual fibre radiates light proportional to the reflectivity of its specific portion of viewed text. The light leaving the light guide is not particularly focussed and can be usefully seen at some angle away from the axis of the light guide. It is this reflected light that is visible to the camera 42.

The images provided by the visual elements 18,20 are two different physically displaced images of the same text. The distance between the two visual elements 18,20 is constant and hence the distance between the two images is constant.

The apparatus must be able to cope with variations in scanning speed, text quality, text size and attitude of the scanning head. Otherwise this will result in distortions. However these variations are reduced to a considerable extent by the use of the pen 34 which introduces an element of control feedback to the operation.

In use the device collects text image information by means of manual scanning of the visual elements along a line of printed text of interest. The principal axis of the linescan camera 42 is arranged such that it is normal to the scan axis and this sequentially collects narrow vertical slices of the scanned image. Successive linescan images are built up to produce an image area that encompasses the whole of the area of the scanned text.

The differences in time between the arrival at the camera 42 of identical or similar image slices is determined. As the distance between the two images is fixed and known, the differential information allows the camera scan velocity to be calculated.

If it is assumed that the device is scanned in such a direction that an image slice is seen first by viewing element 20 then each image slice gathered by the trailing viewing element 18, is compared with earlier images sliced by the leading viewing element 20 until identical or similar image features are found. As each image slice gathered by both viewing elements is identified by a time information, the temporal displacement between identical or similar leading and trailing image slices, and the known fixed distance between the leading and trailing viewing elements allow the velocity of the scanner in the principal scan direction to be determined, and hence by integration, position displacement. Any vertical displacement between the image slices provides position, and by differentiation, velocity in the direction normal to the principal scan direction. This process is repeated throughout the scanning process.

Similarly, by comparison of a reversal of the treatment of the captured image slices, and the success or otherwise in the detection of identical or similar image slices, the direction of scanning can be determined.

These images are converted into digital images and supplied to a camera image memory 48. An image scale corrector 50 uses the scan velocities to scale one of the raw camera images into a normalised image which is fed to a normalised image memory. In being normalised the image recovers any lost proportions from the scanning action.

The normalised image is then presented to the input of a text recognition algorithm. The normalised image can be treated by the text recogniser 54 as if it had been produced by a two dimensional camera. That is that any point in the normalised image bears a fixed geometrical relationship to any other part. By the timely determination of speed or direction of scan by the device, it is possible to compensate for the range of scan speeds that an instructed user may apply to the device.

The text recogniser 54 is capable of converting normalised geometrically accurate images of text characters into simple computer codes e.g., ASC II studied codes, representing such characters. These character codes are then stored in a text character memory area 56 for further processing.

The apparatus has suitable text manipulation facilities including a text storage control 58 and text storage transmitter 60 together with a keypad or keyboard 62 of text and commands. Items of information can be grouped and tagged by the user such that they may be readily identified by a user as to their source and distinction. The text items can be stored within the apparatus for further transmission by means of conventional computer communication means to other computer systems.

The volume of the apparatus may not be much larger than an average sized paperback book. The apparatus is preferably capable of being carried in a coat pocket. When not in use, the pen may clip onto the computer casing.

In practice the user would 'mark' the journal name and date prior to reading. As items of interest are found, the page number would be 'marked' first, followed by appropriate keywords from the text. The scanner computer keyboard can be used to enter text conventionally in cases where it is impractical to 'mark' such as when titles or headlines are in large or unreadable fonts. Each 'marked' item is recorded within the non-volatile memory of the computer in a delimited format, enabling information hierarchies to be maintained. When the user returns to his or her main personal computer, the information is offloaded from the portable equipment into the main information storage database. Any misreads or errors will be trapped by proprietory spelling checker and lexicographical software modules.

It is to be understood that the above described embodiments have been described by way of illustration only. Many modifications and variations are possible.

For example two individual linescan cameras may be used in place of the single camera and two light guides. Alternatively two or more light guides may be provided and one camera may be provided for each light guide. Alternatively two effectively physically displaced linescan images may be extracted from an image presented to an area imaging camera.

In the claims:

1. An information scanning apparatus for scanning human interpretable information, said apparatus comprising image receiving means for scanning said information, said image receiving means providing two separate digital images of said information, said apparatus further comprising stabilizing means for stabilizing said image receiving means as said information is being scanned.

2. An information scanning apparatus as claimed in claim 1, wherein said two separate digital images are spatially offset from each other.

3. An information scanning apparatus for scanning human interpretable information, said apparatus comprising image receiving means for scanning said information and for providing at least one digital image of said information, stabilizing means for stabilizing said image receiving means as said information is scanned, and at least one area imaging camera for receiving said at least one digital image from said image receiving means.

4. An information scanning apparatus for scanning human interpretable information, said apparatus comprising image receiving means for scanning said information and for providing at least one digital image of said information, and stabilizing means for stabilizing said image receiving means as said information is scanned, said stabilizing means including marking means for marking the information which has been scanned.

5. An information scanning apparatus for scanning human interpretable information, said apparatus comprising image receiving means for scanning said information and for providing at least one digital image of said information, and stabilizing means for stabilizing said image receiving means as said information is scanned, said image receiving means including two viewing elements.

6. An information scanning apparatus as claimed in claim 5, wherein the two viewing elements are mounted such that they are not rotatable relative to each other and such that they are not axially rotatable about the axis of viewing.

7. An information scanning apparatus for scanning human interpretable information, said apparatus comprising image receiving means for scanning said information and for providing at least one digital image of said information, and stabilizing means for stabilizing said image receiving means as said information is scanned, said image receiving means and said stabilizing means being connected so as to permit axial translation of the image receiving means relative to the stabilizing means.

* * * * *